E. WALKER.
ICE CREAM DISHER.
APPLICATION FILED NOV. 15, 1915.
1,194,685.
Patented Aug. 15, 1916.
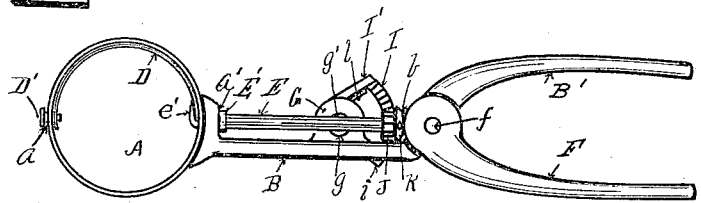
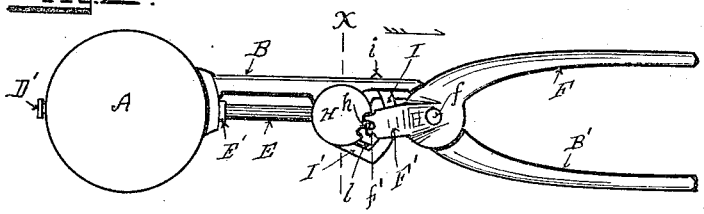
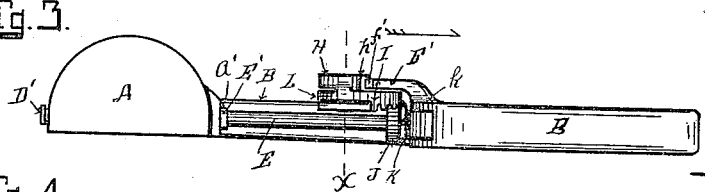
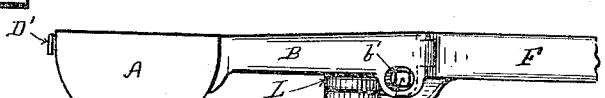
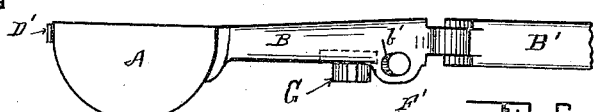
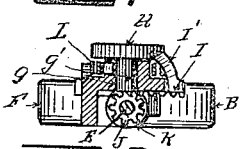
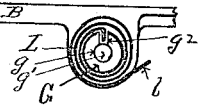
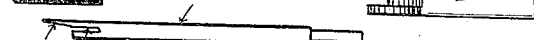
Inventor.
Edwin Walker
By J. C. & H. M. Sturgeon
atty's

UNITED STATES PATENT OFFICE.

EDWIN WALKER, OF ERIE, PENNSYLVANIA.

ICE-CREAM DISHER.

1,194,685.         Specification of Letters Patent.       Patented Aug. 15, 1916.

Application filed November 15, 1915. Serial No. 61,560.

*To all whom it may concern:*

Be it known that I, EDWIN WALKER, a citizen of the United States, residing at Erie, in the county of Erie and State of Pennsylvania, have invented certain new and useful Improvements in Ice-Cream Dishers; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

This invention relates to ice-cream dishers, and particularly to the type thereof generally known as "automatic" dishers, adapted to be held and operated with one hand, to dip and discharge cream therefrom.

The objects of the invention will be clearly understood from the drawings and description thereof hereinafter contained.

The invention consists in the several novel features hereinafter described, and particularly defined by the claims, and illustrated in the accompanying drawings, in which:—

Figure 1, is a top or plan view of my improved ice-cream disher. Fig. 2, is a plan view of the rear or lower side of the same. Fig. 3, is a side view in elevation of the right side of the same. Fig. 4, is a side view in elevation of the left side of the same, with part of the handle broken away. Fig. 5, is a side view in elevation, of a portion of the handle section of the same. Fig. 6, is a side view in elevation of a portion of the lever section of the same. Fig. 7, is a transverse section of the same on the line $x$—$x$ in Figs. 2 and 3. Fig. 8, is a detail view of a portion of the handle. Fig. 9, is a detail showing the scraper operating shaft without the scraper and gear. Fig. 10, is a detail showing the scraper, scraper-shaft, and the operating pinion thereon in section.

The disher comprises substantially a frame, one end of which is rigidly and permanently secured to one side of a hemispherical bowl, A. This frame consists substantially of a straight portion B, forming the shank thereof, and an integral handle portion B', which is laterally offset with respect to the shank portion B.

Operating within the bowl A, there is a semi-circular scraper D, adapted to sweep over the inner surface of the bowl, and sever the cream therefrom. This scraper D, is secured at one end, to a shaft E, by bending the end $d$, thereof outwardly, and inserting it into a slot $e$, in the end of the shaft E, and then bending an outward extension $e'$, on the shaft E, at one side of the slot $e$, shown in Fig. 9, downward over the inside face of the scraper D, and soldering the whole together as clearly shown; whereby I secure a strong and substantial connection between the shaft E, and scraper D. To further strengthen this joint, I preferably place a sleeve E', over the slot $e$, in the end of the shaft E, but this sleeve E', may be dispensed with if desired.

On the outer end of the scraper D, there is a trunnion D', adapted to fit and be secured in a bearing $a$, in the side of the edge of the bowl A, and a bearing $a'$, is formed in the bowl opposite the bearing $a$, and adjacent to and at one side of the junction of the shank B, of the frame, with the bowl A, through which bearing $a'$, the shaft E, passes and operates; while the outer end of the shaft E, operates in a suitable bearing at the junction of the shank B, and the handle portion B', of the frame, and the shaft E, is so located at the side of the shank B, of the frame, as to protect it from injury in case the operator raps the shank B, against the edge of the cream-tub.

On the shank portion B, of the frame, there is a lateral projection G, having a central opening $g$, therein, adapted to receive a stud $g'$, projecting inwardly from the hub H, forming the axis of and supporting a curved rack-gear I. At the junction of the shank B, and the handle portion B', of the frame, a lever F, is pivoted on a pintle $f$, and projects rearwardly approximately parallel with the handle portion B', of the frame, and is adapted to be grasped together with the handle portion B', in the hand of the operator, when using the disher. On the lever F, there is an arm F', projecting forwardly from the axis thereof, and preferably provided at its outer end with gear-teeth $f'$, engaging gear-teeth $h$, on the hub H, of the curved rack-gear I, as clearly shown in Fig. 2, whereby the curved rack-gear I, can be operated by compressing the lever F, toward the handle B'. The curved rack-gear I, engages and intermeshes with a spur-gear J, and the end $i$, of this curved rack-gear I, preferably extends through an opening $b$, in the shank B, which operates to retain the stud $g$, in the opening $g'$ in the lateral projection G, and also to retain the teeth of the curved rack-gear I, in mesh with the teeth of the spur-gear J. This spur-gear J, is secured to the scraper-shaft E, by forming a sleeve J' thereon, and over this sleeve I place a collar K, the periphery of which projects beyond the teeth of the spur-gear J, and engages the periphery of the curved rack-gear I; the spur-gear J, and the collar K, being secured together and to the shaft E, preferably by means of a pin $k$, passing therethrough; this construction operating to strengthen the gear, and by the engagement of the collar K, with the periphery of the curved rack I, prevents longitudinal movement of the shaft E. Around the projection G, there is a spiral spring L, the inner end of which engages a slot $g^2$, in the projection G, while the outer end $l$, of said spring engages the inside of the curved rack I, and operates upon the mechanism to return the lever F, to its normal position, and at the same time actuates the shaft E, and the scraper D, in one direction, they being operated in the opposite direction by pressing the lever F, toward the handle portion B', of the frame.

In operating this device the operator grasps the handle portion B' of the frame, and the lever F, dips the bowl A, into the cream to fill it, and to discharge the cream from the bowl, presses the lever F, inwardly. This operation of the lever F, operates to rotate the hub H, and the curved rack I, secured thereto, which rack, operating on the spur-gear J, rotates the shaft E, and the scraper D, in the bowl A, so as to scrape the cream from the inner surface thereof, and upon the release of the lever F, the spring L, operating on the rack I, rotates the shaft E, and the scraper D, back to their normal position, as shown in Fig. 1, ready for another operation.

The invention hereinbefore described is not to be understood to be restricted to the details set forth, as these may be modified within the scope thereof, without departing from the scope of the invention.

Having thus described my invention so as to enable others to utilize the same, what I claim as new and desire to secure by Letters Patent is:—

1. An ice-cream disher comprising a frame substantially consisting of shank and handle portions, a bowl secured to the shank portion of the frame, a scraper in the bowl, a scraper-shaft secured thereto, and extending along one side of the shank portion of the frame, a lever pivoted to the frame at the junction of the shank and handle portions thereof, a curved rack-gear mounted on the shank of the frame, a spur-gear on the scraper-shaft engaging therewith, a forwardly projecting arm on said lever engaging and operating said curved rack-gear, and a retracting spring operating on said curved rack-gear, substantially as set forth.

2. An ice-cream disher comprising a frame substantially consisting of shank and handle portions, a bowl secured to the shank portion of the frame, a scraper in the bowl, a scraper-shaft secured thereto, and mounted in said frame, a spur-gear on said shaft, and curved rack-gear mounted on the frame and engaging said spur-gear, a lever pivoted to the frame at the junction of the shank and handle portions, and extending rearwardly approximately parallel with the handle portion of the frame, an arm extending forwardly from the axis of said lever and engaging and operating said curved rack-gear, and a retracting spring operating on said curved rack-gear, substantially as set forth.

3. An ice-cream disher comprising a frame substantially consisting of shank and handle portions, the handle portion being offset to one side of the line of the shank portion, a hemispherical bowl secured to the shank portion of the frame, a scraper in the bowl, a trunnion on the outer end of the scraper secured in the bearing in the bowl, a scraper-shaft secured to the opposite end of the scraper and extending through a bearing in the side of the bowl and along one side of the shank of the frame, to the junction of the handle therewith, a lever pivoted at the junction of the shank and handle, a forwardly projecting arm on said lever, a curved rack-gear mounted on the shank of the frame, a spur-gear on the scraper-shaft engaging said curved rack gear, a forwardly extending arm on the lever engaging the axis of said curved rack-gear, and a spring around the axis of and engaging said curved rack-gear for actuating it in one direction, substantially as set forth.

4. An ice-cream disher comprising a frame substantially consisting of shank and handle portions, a bowl secured to the shank portion of the frame, a semi-circular scraper in said bowl, a trunnion on the outer end of the scraper secured in a bearing in the bowl, a scraper-shaft secured to the inner end of said scraper and mounted in a bearing in the bowl at one side of the shank portion of the frame, a spur-gear and collar secured to said shaft near its rear end, a bearing at the rear end of the shank for the rear end of said shaft, a projection on said shank, a curved rack-gear mounted thereon and intermeshing with the spur-gear on said shaft, and engaging the collar thereon, a retracting spring on said projection engaging said curved rack-gear, a lever pivoted to the frame substantially at the junction of the shank and handle portions of the frame, and extending rearwardly approximately parallel with the handle portion of the frame, an arm on said lever extending forwardly from the axis thereof, gear teeth on the end of said extension and gear teeth on the hub of the curved rack-gear engaging the teeth of said extension, substantially as set forth.

5. An ice-cream disher comprising a frame substantially consisting of integral shank and handle portions, the handle portion being offset at one side of the line of the shank portion, a hemispherical bowl secured to the shank portion of the frame, a semi-circular scraper mounted in bearings in the bowl, a scraper-shaft embracing one end of the scraper with a lip thereon turned down over the inside of the scraper and secured thereto, said shaft extending centrally along one side of the shank to a bearing in the offset connecting the shank with the handle, a spur gear on the scraper-shaft near the rear end thereof, a curved rack-gear mounted on a projection on the shank portion of the frame and engaging the spur-gear on the scraper-shaft, a rearwardly extending lever pivoted at the offset connecting the shank and handle portions of the frame, a hub on the curved rack gear, an arm extending forwardly from the axis of said lever to and engaging the hub of the curved rack-gear, and a retracting spring on the projection supporting the curved rack-gear, and engaging said curved rack-gear so as to move it in one direction, substantially as set forth.

6. In an ice-cream disher, the combination of a bowl, a handle secured thereto, a scraper in said bowl, a scraper-shaft therefor, having a slot in the end thereof to receive the out turned end of the scraper, a lip on said shaft projecting from one side of the slot in the shaft, bent down over the inside of the scraper and secured thereto, and means for operating said scraper-shaft, substantially as set forth.

7. An ice-cream disher, the combination of a hemispherical bowl, a handle secured thereto, a semi-circular scraper in said bowl, a scraper-shaft therefor, having a slot in the end thereof to receive the out turned end of the scraper, a projecting lip on the shaft at one side of the slot bent down over the inside of the scraper and secured thereto, a ferrule on said shaft around the slot, and means for operating said shaft, substantially as set forth.

8. In an ice-cream disher, the combination of a bowl, a handle secured thereto, a scraper in said bowl, a scraper-shaft therefor, having a slot in the end thereof, to receive the out turned end of the scraper, a projecting lip on the shaft at one side of the slot bent down over the inside of the scraper and soldered thereto, a spur-gear near the opposite end of the shaft, a sleeve thereon, a collar on said sleeve, engaging the periphery of a curved rack-gear, engaging said spur-gear, a pin passing through said collar, spur-gear and shaft, and mechanism for operating said curved spur-gear-rack, substantially as set forth.

In testimony whereof I affix my signature.

EDWIN WALKER.

Copies of this patent may be obtained for five cents each, by addressing the "Commissioner of Patents, Washington, D. C."